(12) United States Patent
Nakano

(10) Patent No.: US 6,580,805 B1
(45) Date of Patent: Jun. 17, 2003

(54) METHOD AND RECOGNIZING MUSIC AND COMPUTER-READABLE RECORDING MEDIUM HAVING MUSIC-RECOGNIZING PROGRAM RECORDED THEREIN

(75) Inventor: Seiji Nakano, Hamamatsu (JP)

(73) Assignee: Kabushiki Kaisha Kawai Gakki Seisakusho, Hamamatsu (JP)

( * ) Notice: Subject to any disclaimer, the term of this patent is extended or adjusted under 35 U.S.C. 154(b) by 0 days.

(21) Appl. No.: 09/380,225

(22) PCT Filed: Jun. 29, 1998

(86) PCT No.: PCT/JP98/02895
§ 371 (c)(1),
(2), (4) Date: Nov. 15, 1999

(87) PCT Pub. No.: WO99/34352
PCT Pub. Date: Jul. 8, 1999

(30) Foreign Application Priority Data

Dec. 26, 1997 (JP) .............................................. 9-366878

(51) Int. Cl.$^7$ .............................. G06K 9/00; G06K 9/38
(52) U.S. Cl. ...................... 382/100; 382/270; 382/273; 382/113
(58) Field of Search .................................. 382/100, 272

(56) References Cited

U.S. PATENT DOCUMENTS 5,706,363 A  *  1/1998  Kikuchi ...................... 382/113
5,825,905 A  * 10/1998  Kikuchi ...................... 345/781

FOREIGN PATENT DOCUMENTS

| JP | 01-304497 | 12/1989 | |
| JP | 2-87776 | 3/1990 | |
| JP | 02-087776 | 3/1990 | |
| JP | 7-85245 | * 3/1995 | ............ G06T/1/00 |

* cited by examiner

*Primary Examiner*—Leo Boudreau
*Assistant Examiner*—Hussein Akhavannik
(74) *Attorney, Agent, or Firm*—Christie, Parker & Hale, LLP

(57) ABSTRACT

A music score image is read, a two-valuing threshold is set based on a staff interval and a line width of the staff so as to input the music score image as a two-valued image, then music signs are recognized to prepare data for playing and/or music score displaying. With this arrangement, the image two-valuing threshold which seriously affects the recognition rate can be automatically set to an optimum value for the recognition.

11 Claims, 10 Drawing Sheets

METHOD AND RECOGNIZING MUSIC AND COMPUTER-READABLE RECORDING MEDIUM HAVING MUSIC-RECOGNIZING PROGRAM RECORDED THEREIN

TECHNICAL FIELD

The present invention relates to a music score recognizing method and a computer-readable recording medium storing a music score: recognizing program,

BACKGROUND ART

When inputting an image using a scanner or the like for recognizing a character or sign included therein, an adjustment of inclination of the original which seriously affects the recognition rate, as well as an adjustment of resolution of the image to be inputted are carried out. Further, when inputting an two-valued image, it is necessary to set a two-valuing threshold so as to judge the two-valued image.

It is relatively easy to realize the optimum states with respect to the inclination of the original and the input resolution. However, with respect to the two-valuing threshold, since it depends on the recognition algorithm, it is difficult to set an optimum value when the recognition algorithm is not known. Further, depending on the display resolution, it is often impossible to fully check the two-valued state with the eye.

Thus, it often occurs that the recognition performance can not be fully derived due to impropriety of a two-valuing threshold which is manually set.

Further, when it is found after performing the recognition that a cause of the low recognition rate is the two-valuing threshold, if the recognition is performed again from inputting of the image, there is raised a problem that the number of processing steps eventually increases to take much time for the processing.

The present invention has been made in view of the foregoing problems of the prior art and provides a structure which can automatically set an image two-valuing threshold, which seriously affects the recognition rate, to an optimum value for the recognition.

DISCLOSURE OF THE INVENTION

Therefore, a structure of claim 1 is basically characterized in that in a music score recognizing method of reading a music score image and recognizing music signs therein to prepare data for playing and/or music score displaying, a two-valuing threshold is set using music score information so as to input the music score image as a two-valued image.

A structure of claim 4 provides the foregoing procedure as a recording medium. The concrete structure thereof is basically characterized in that in a computer-readable recording medium storing a music score recognizing program for reading a music score image and recognizing music signs therein to prepare data for playing and/or music score displaying, the music score recognizing program allows execution of an information reading step of reading music score information, a threshold setting step of setting a two-valuing threshold based on the read music score information, and a two-valued image inputting step of inputting the music score image as a two-valued image based on the set two-valuing threshold.

In these structures, the setting of the two-valuing threshold is performed based on the music score information. Accordingly, the setting by an operator based on trial and error is not required, and an optimum threshold can be automatically set and recognition is carried out. This can also improve the whole recognition rate. In the case, it is preferable that as shown in FIG. 1, a staff interval H and a line width t of the staff are derived as music score information and a threshold which renders optimum the ratio therebetween is detected. The reason for this will be explained hereinbelow. When a two-valuing threshold changes, darkness of a two-valued image changes so that thickness of a line changes. Thus, depending on the two-valuing threshold, a line width of the staff of a music score image changes. Various music scores are inputted as images with gradations which are then two-valued using various thresholds. When a value obtained by normalizing a line width of the staff by a staff interval (a ratio of the line width of the staff relative to the staff interval) takes an approximately constant value with respect to the two-valued images which achieve the highest recognition rates, if a two-valuing threshold is set to achieve as close such a value as possible, the two-valued music score image can be produced with an adequate recognition rate. When the ratio of the line width of the staff relates to the staff interval at the optimum threshold changes depending on the resolution or the like (a case wherein when the resolution is low, the recognition rate increases as the ratio of the line width of the staff relative to the staff interval increases, while when the resolution is high, it is reversed), a target value may be changed through a linear function, a table conversion or the like relative to the staff interval.

Further, when a line width or an interval of the staff differs per paragraph or per part, an adequate threshold can not be set only by deriving the staff interval and the line width of the staff. Thus, in a structure of claim 2. the image is divided Into a plurality of blocks (for example, divided per paragraph, per part, per staff and further in a transverse direction), and a two-valuing threshold is set per block using music score information so as to input the music score image as a two-valued image.

Similarly, a structure of claim 5 provides the foregoing procedure as a computer-readable recording medium storing a music score recognizing program. The concrete structure thereof is such that the recording medium includes the music score recognizing program which allows execution of an image reading step of reading the image, an image dividing step of dividing the read image into a plurality of blocks, an information reading step of reading music score information per block, a threshold setting step of setting a two-valuing threshold per block based on the read music score information, and a two-valued image inputting step of inputting the music score image as a two-valued image based on the two-valuing threshold set per block. Also in this structure, it is needless to say that the staff interval and the line width of the staff are appropriate as the foregoing music score information.

BEST MODE FOR CARRYING OUT THE INVENTION

Carrying-Out Mode 1

Figure 1:
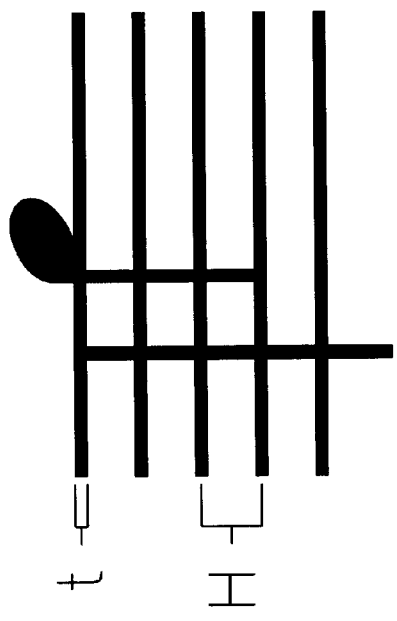
FIG. 1 is an explanatory diagram showing a line width of the staff and a staff interval.
Figure 2:
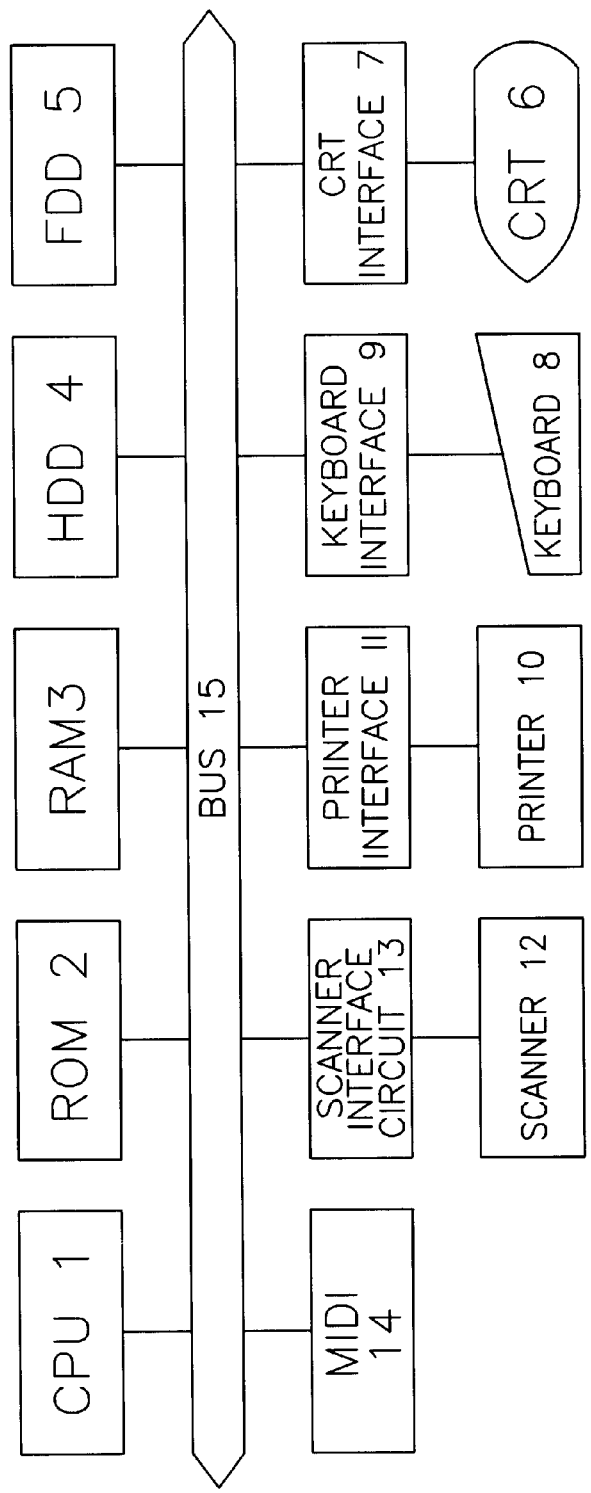
FIG. 2 is a block diagram showing a carrying-out mode structure of a music score recognizing system which is operated by reading into an external storage device a computer-readable recording medium storing a music score recognizing program according to claim 4.

Hereinbelow, one carrying-out mode of the present invention will be described based on the accompanying drawings. FIG. 2 is a block diagram showing a carrying-out mode structure of a music score recognizing system which is operated by reading Into an external storage device such as a later-described flexible disk drive FDD 5 (or a CD-ROM drive or the like) a computer-readable recording medium storing a music score recognizing program according to claim 4. The system is in the form of a computer such as a personal computer, added with a scanner and a MIDI interface circuit. A CPU 1 is a central processing unit for controlling the whole music score recognizing system based on programs stored in a ROM 2 or RAM 3. Further, a timer circuit is included for executing an interrupt to the CPU 1 per given preset period. Other than as a program area, the RAM 3 is also used as an image data buffer, a work area, etc. A hard disk drive HDD 4 and the flexible disk drive FDD 5 store programs, image data, playing data, etc. Under the control of the CPU 1, a CRT 6 displays image data outputted from a CRT interface circuit 7. Data inputted via a keyboard 8 is transferred into the CPU 1 via a keyboard interface circuit 9. Under the control of the CPU 1, a printer 10 prints print data outputted from a printer interface circuit 11.

A scanner 12 optically scans, for example, a (printed) music score and converts a gray-scale or color image into monochrome data with gradations (a two-valued image can also be inputted), and can be of a desired type, such as a flat-bed type, a handy type or a feeder type. Image data captured by the scanner 12 is inputted into the RAM 3 or the HDD 4 via a scanner interface circuit 13. A MIDI interface circuit 14 is a circuit for carrying out transmission/reception of MIDI data relative to an external MIDI device such as a tone generator module. A bus 15 connects the respective circuits in this music score recognizing system for allowing them to exchange various data, programs, addresses, etc. In addition thereto, a pointing device such as a mouse, a serial interface circuit such as an RS232C, or the like may be provided.

Figure 3:
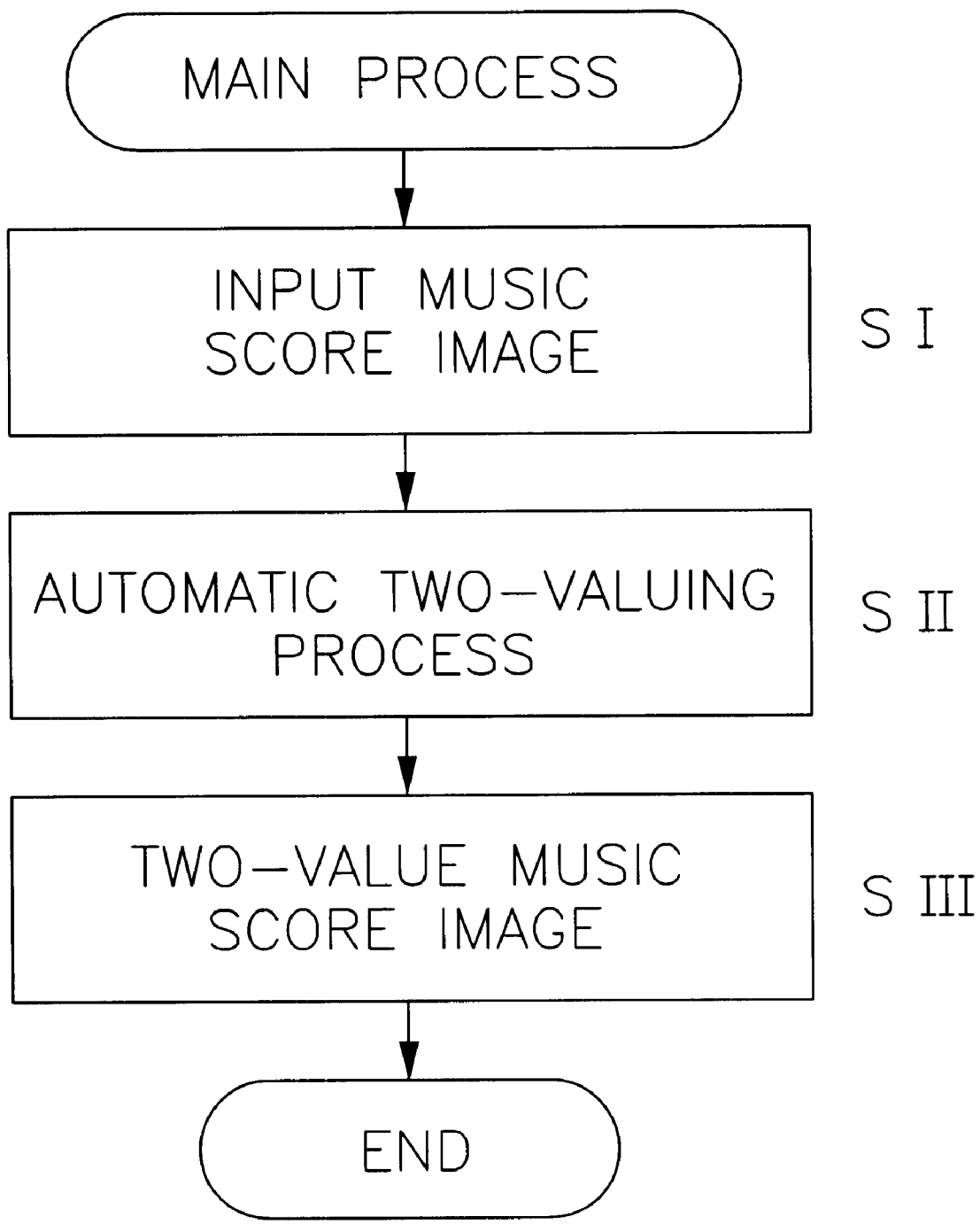
FIG. 3 is a flowchart showing a main process of a CPU.

FIG. 3 is a flowchart showing a main process of the CPU 1. At step SI, a music score image (including a line width of the staff and a staff interval as music score information) is inputted into the RAM 3 using the scanner 12. The image is inputted as monochrome image with gradations. Naturally, an image file kept in a hard disk or the like in such a format may be read in. In case of a color image, it can be converted into a monochrome image with gradations through processing corresponding to an image format thereof. When an image inputted by the scanner or read in as a file is a two-valued image, automatic two-valuing can not be implemented. Accordingly, it is recognized as it is, or the inputting is performed again as an image with gradations for implementing automatic two-valuing. When the storage capacity of the RAM 3 inputted with the music score image is insufficient, the image may be partly stored in the RAM 3 and processed in sequence. In this structure, the image is inputted with each pixel represented by 8 bits, i.e. with 256 gradations, but not limited to such a number of bits. Hereinbelow, explanation will be given wherein the gradation is white as a numerical value increases and black as a numerical value decreases.

At step SII, an automatic two-valuing process (threshold setting process) is implemented. This automatic two-valuing process will be described later. Then at step SIII, the inputted image with gradations is two-valued based on the set two-valuing threshold so that the music score image is inputted as a two-valued image.

Figure 4:
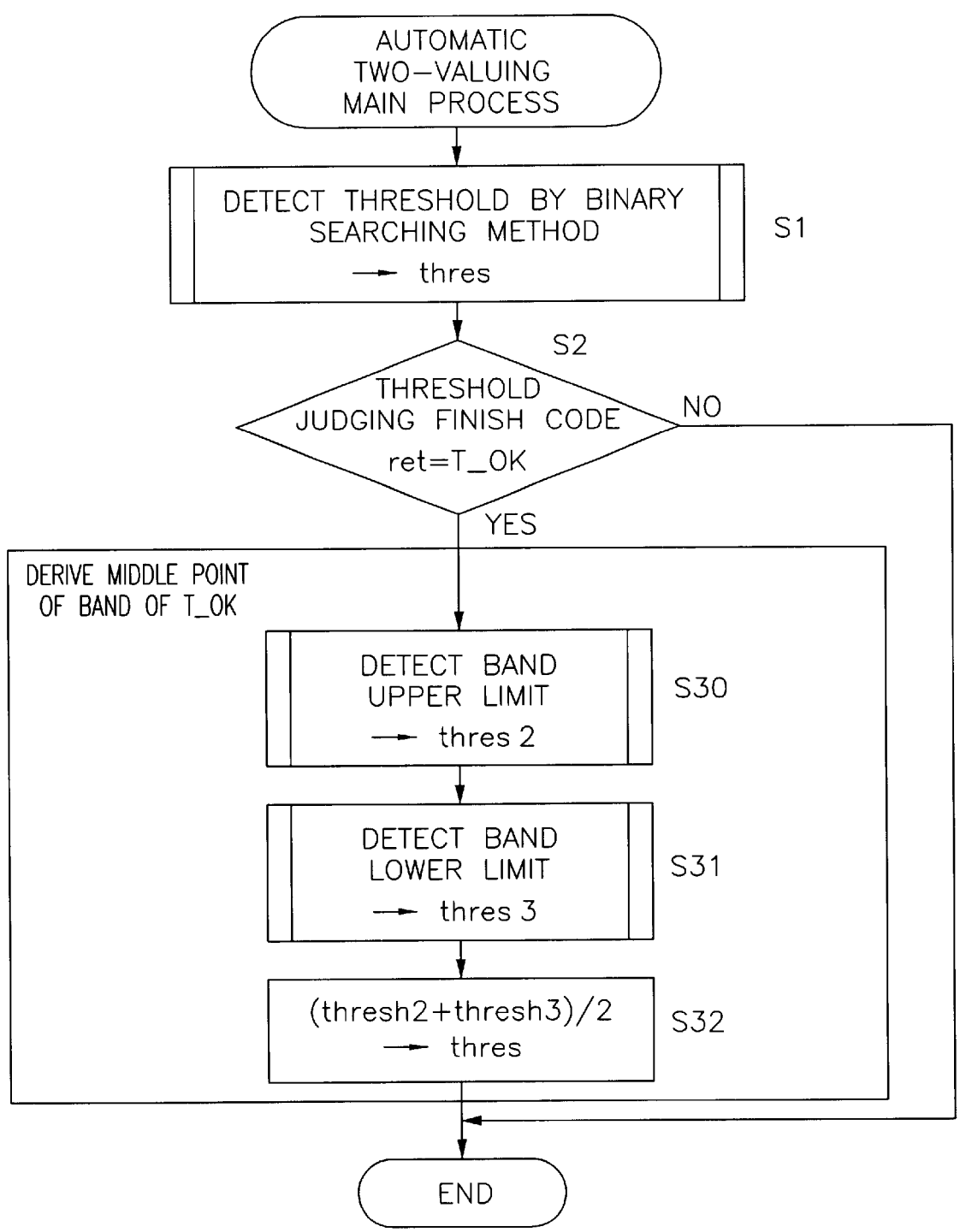
FIG. 4 is a flowchart showing main process steps of an automatic two-valuing process.

FIG. 4 shows main process steps of the foregoing automatic two-valuing process. First at step S1, detection of a threshold (thres) is carried out according to a binary searching method. It may be arranged to detect a line width of the staff and a staff interval at each of all 256 steps so as to derive a target threshold. However, since there will be raised a problem in execution speed, an optimum threshold is derived according to the binary searching method. This process will be described later.

As described above, in case of about 256 gradations, a target threshold can be obtained through about 8-time loops of the binary searching method. In this carrying-out mode, however, since a staff interval and a line width of the staff are derived in integers, the ratio of the line width of the staff relative to the staff interval changes by stages, so that the target threshold may be detected less than 8 times. The automatic two-valuing threshold detection process may be finished in this state. However, when a band of the value corresponding to the target ratio is wide, a more accurate threshold can be obtained by setting a threshold to the middle point of the band. Therefore, at step S3, when a band where the ratio becomes a value equal to a target value exists, the upper and lower limits of the band are derived to set a threshold (thres) to the middle point thereof. Step S2 is a process executed for judging whether there exists a band where the ratio becomes a value equal to a target value, and judges whether a value of a result (ret) of a threshold judging process becomes a threshold judging finish code [T_OK (a value when agreeing with a target ratio DEST_PER)]. As described above, step S3 is a process for deriving the upper and lower limits of the band to set a threshold (thres) to the middle point thereof. Specifically, a band upper limit (thres2) is detected at step S30, a band lower limit (thres3) is detected at step S31, and the middle point between the upper limit (thres2) and the lower limit (thres3) is derived to set it as a threshold (thres) at step S32. The detection of the upper and lower limits may also be carried out according to the binary searching method as described later. On the other hand, if a line width of the staff and a staff interval are detected in real numbers or the like so as to change the ratio fully continuously, the detection process of the upper and lower limits of the band is not required. Thereafter, as described above, at step SIII the inputted image with gradations is two-valued based on the set two-valuing threshold so that the music score image is inputted as the two-valued image.

Figure 5:
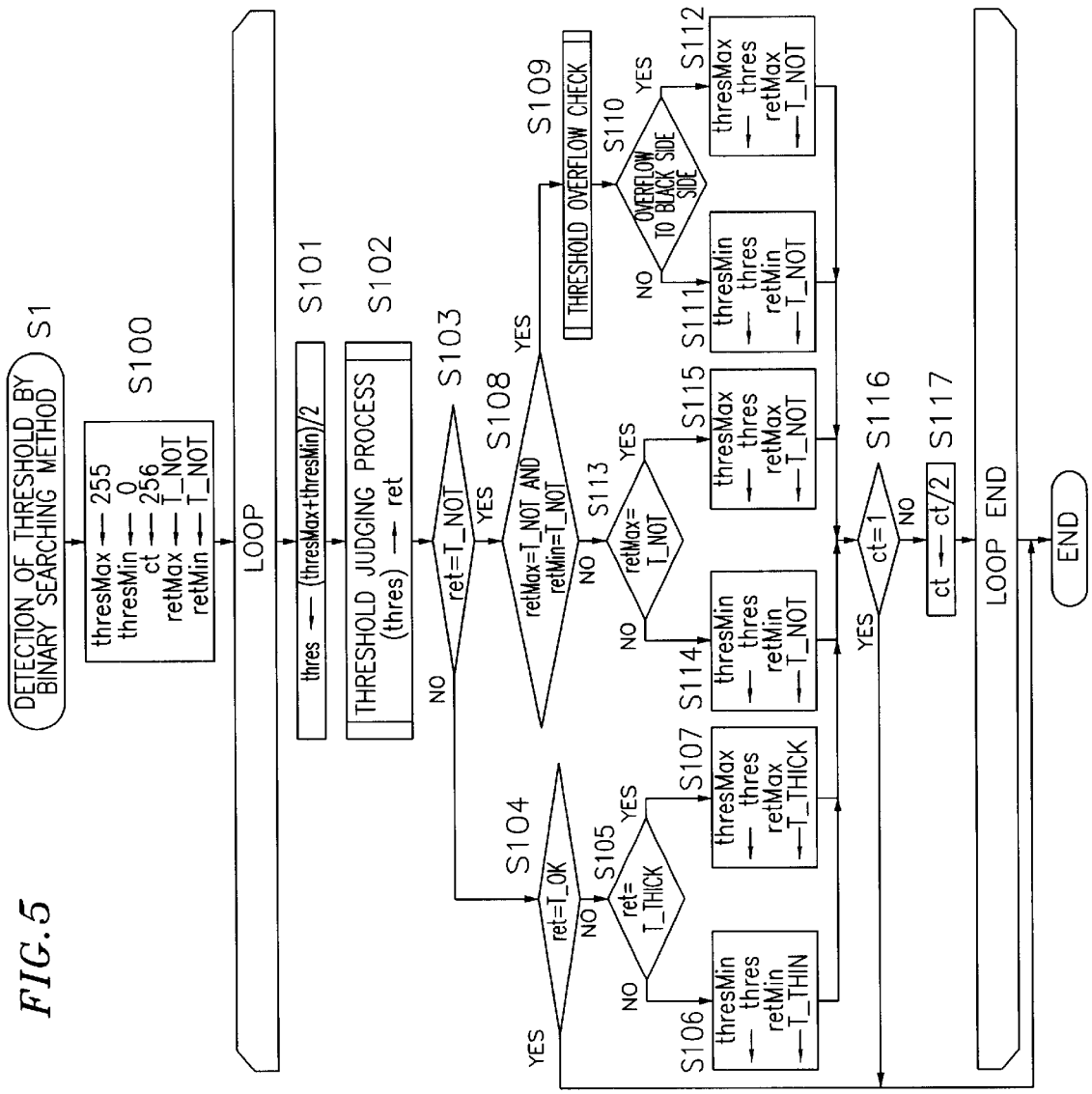
FIG. 5 is a flowchart showing a procedure of detecting a threshold according to a binary searching method.

FIG. 5 shows a procedure of detecting the threshold (thres) according to the binary searching method at the foregoing step S1. At step S100, initial setting is performed. Specifically, a maximum threshold (thresMax) is set to a gradation maximum value 255, a minimum threshold (thresMin) is set to a gradation minimum value 0, a counter (ct) for counting the number of repetition times of a threshold detection process loop according to the binary searching method is set to 256, and a maximum value (retMax) of a threshold judging process result and a minimum value (retMin) thereof are set to T_NOT which represents no detection of a staff interval and a line width of the staff.

Then at step S101, an intermediate value between the foregoing thresmax and thresMin is set as a threshold (thres). At step S102, a later-described judging process for the threshold (thres) is executed and a result thereof is set as ret. As the judging process results, there are, as described later, T_OK (an output result when the threshold is judged to equal to the target ratio DEST_PER), T_THIN (an output result when the threshold is judged to be smaller than the target ratio DEST_PER, i.e. when a line width of the staff is judged to be small), T_THICK (an output result when the threshold is judged to be greater than the target ratio DEST_PER, i.e. when a line width of the staff is judged to be large), and T_NOT (an output result when it is judged that a staff interval and a line width of the staff can not be detected).

At step S103, it is judged whether the foregoing judging process result (ret) is T_NOT. If judged not to be T_NOT, i.e. if a staff interval and a line width of the staff can be detected, the processing shifts to step S104 where it is judged whether the foregoing judging process result (ret) is T_OK. If the process result (ret) is T_OK, the processing goes out of the loop so that the threshold detection process according to the binary searching method is finished (i.e. judgment at step S2 in FIG. 4 becomes YES so that the processing shifts to step S3). On the other hand, if the process result (ret) is not T_OK, the processing shifts to step S105 where it is judged whether the process result (ret) is T_THICK. If the process result is T_THICK (when the line width of the staff is large), the maximum threshold (thresMax) is set to the threshold (three) at step S107 so that the maximum threshold (thresMax) is changed to a smaller value upon recalculating the threshold using an equality at step S101 (resetting the threshold so that the line width of the staff becomes smaller). On the other hand, if the foregoing process result is not T_THICK (when the line width of the staff is small), the minimum threshold (thresMin) is set to the threshold (thres) at step S106 so that the minimum threshold (thresMin) is changed to a larger value upon recalculating the. threshold using the equality at step S101 (resetting the threshold so that the line width of the staff becomes greater).

At step S103, if the foregoing judging process result (ret) is T_NOT, i.e. if a staff interval and a line width of the staff can not be detected, it is Judged using a threshold overflow check of step S109 and subsequent steps whether the threshold deviates to a dark side or a light side, and the processing according to the binary searching method is implemented based on the judgment. Since the threshold overflow check is a high-cost process, the threshold judgment results of both ends are kept as a minimum value (retMin) of the results and a maximum value (retMax) thereof. At step S108, it is judged whether retMax and retMin are T_NOT. If both are T_NOT, the threshold overflow check is carried out at step S109. Then at step S110, it is judged whether the threshold deviates to the dark side or the light side. If it overflows to the black side, the maximum value (thresMax) is set to the threshold (thres) and the maximum value (retMax) of the threshold judgment result becomes T_NOT at step S112. On the other and, if it overflows to the white side, the minimum value (thresMin) is set to the threshold (thres) and the minimum value (retMin) of the threshold judgment result becomes T_NOT at step S111.

If one of retMax and retMin is judged not to be T_NOT at step S108, a process according to the binary searching method is implemented at step S113 and subsequent steps so as to approach a side away from T_NOT, so that the number of calling times of the threshold overflow check can be reduced. At step S113, it is judged which of retMax and retMin is not T_NOT. If retMax is not T_NOT, the minimum value (thresMin) is set to the threshold (thres) and the minimum value (retMin) of the threshold judgment result becomes T_NOT at step S114. If retMin is not T_NOT, the maximum value (thresMax) is set to the threshold (thres) and the maximum value (retMax) of the threshold judgment result becomes T_NOT at step S115.

If the threshold judgment result (ret) is other than T_OK, the value of the counter (ct) is reduced by half at step S117 so that the foregoing processing is repeated in loop until the value of the counter (ct) becomes 1 (step S116). As described above, the start band is set from thresMin to thresMax and then the region is narrowed according to the binary searching method so that the finally judged result becomes the two-valuing threshold (thres) (referring step S1).

Figure 6:
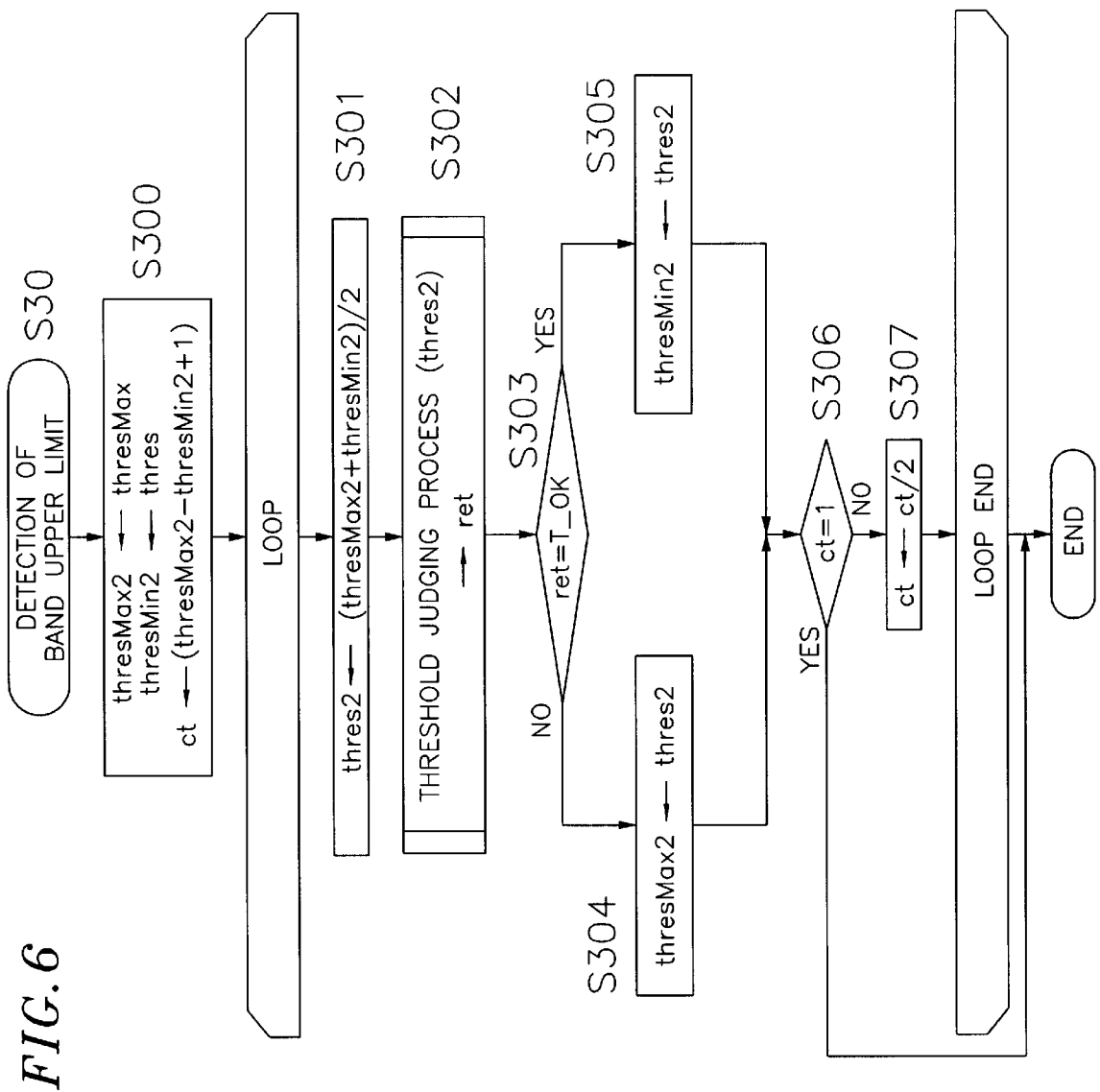
FIG. 6 is a flowchart showing a procedure of detecting a band upper limit for determining which point of a band of T_OK is set as a threshold when a threshold judgment is finished with T_OK.

When the two-valuing threshold is detected as described above and then the threshold Judgment is finished with ret=T_OK at step S2, it is necessary to determine which point of the band of T_OK is set as the threshold at step S3. FIG. 6 shows a procedure of detecting the band upper limit (thres2) at step S30 for making such a determination.

First at step S300, initial setting is carried out. Specifically, the foregoing maximum threshold (thresMax), as it is, is set as a maximum threshold (thresMax2) in this processing, the threshold (thres) derived in the foregoing processing is set as a minimum threshold (thresMin2) in this processing, and the counter (ct) for counting the number of repetition times of a threshold detection process loop according to the binary searching method is set to a value obtained by subtracting the minimum threshold (thresMin2) from the maximum threshold (thresMax2) and then adding 1.

Then at step S301, a central value between the foregoing thresMax2 and thresMin2 is set as a threshold (thres2). At step S302, a later-described judging process for the threshold (thres2) is implemented and a result thereof is set as ret. As the judging process results, there are, as described later, T_OK (an output result when the threshold is judged to be equal to the target ratio DEST_PER), T_THIN (an output result when the threshold is judged to be smaller than the target ratio DEST_PER, i.e. when a line width of the staff is judged to be small), T_THICK (an output result when the threshold is judged to be greater than the target ratio DEST_PER, i.e. when a line width of the staff is judged to be large), and T_NOT (an output result when it is judged that a staff interval and a line width of the staff can not be detected).

At step S303, it is judged whether the foregoing judgment result (ret) is T_OK. If judged to be T_OK, i.e. if the judgment result (ret) becomes equal to the target ratio (DEST_PER), the foregoing threshold (thres2) is set as the minimum threshold (thresMin2) at step S305. If the foregoing judgment result (ret) is judged not to be T_OK at step S303, the threshold (thres2) is set as the maximum threshold (thresMax2) at step S304. Thereafter, the value of the counter (ct) is reduced by half at step S307 so that the foregoing processing is repeated in loop until the value of the counter (ct) becomes 1 (step S306). As described above, in the detection flow of the band upper limit when the ratio of a line width of the staff relative to a staff interval has a certain band, a search is made from thres to thresMax according to the binary searching method at a time point where thres=T_OK, so as to detect a boundary between a region of T_OK and a region of not T_OK. Specifically, the start band is set from thresMin2 to thresMax2 and then the region is narrowed according to the binary searching method. The finally judged result becomes thres2 (referring step S30).

The detection of the band lower limit at step S31 is implemented using the similar flow, and a result of the lower limit is set as thres3. In this case, a search is made from thres to thresMin according to the binary searching method so as to detect a boundary between a region of T_OK and a region of not T_OK. Since a processing procedure is similar to the detection of the foregoing band upper limit, explanation thereof is omitted. Then, as described above, the middle point between thus derived thres2 and thres3 is set as a threshold (thres) at step S32.

Figure 7:
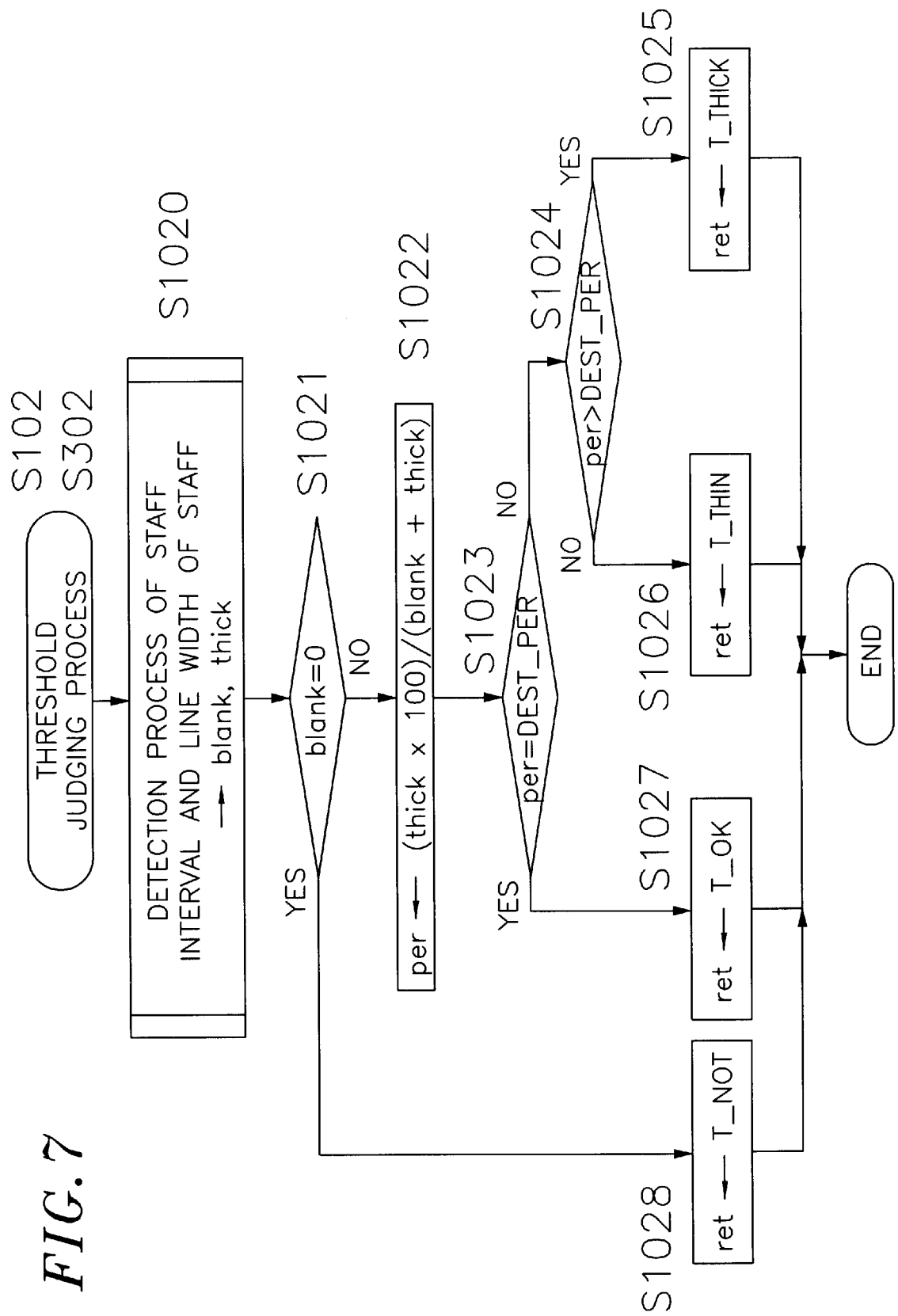
FIG. 7 is a flowchart showing a processing flow of threshold judgment.
Figure 8:
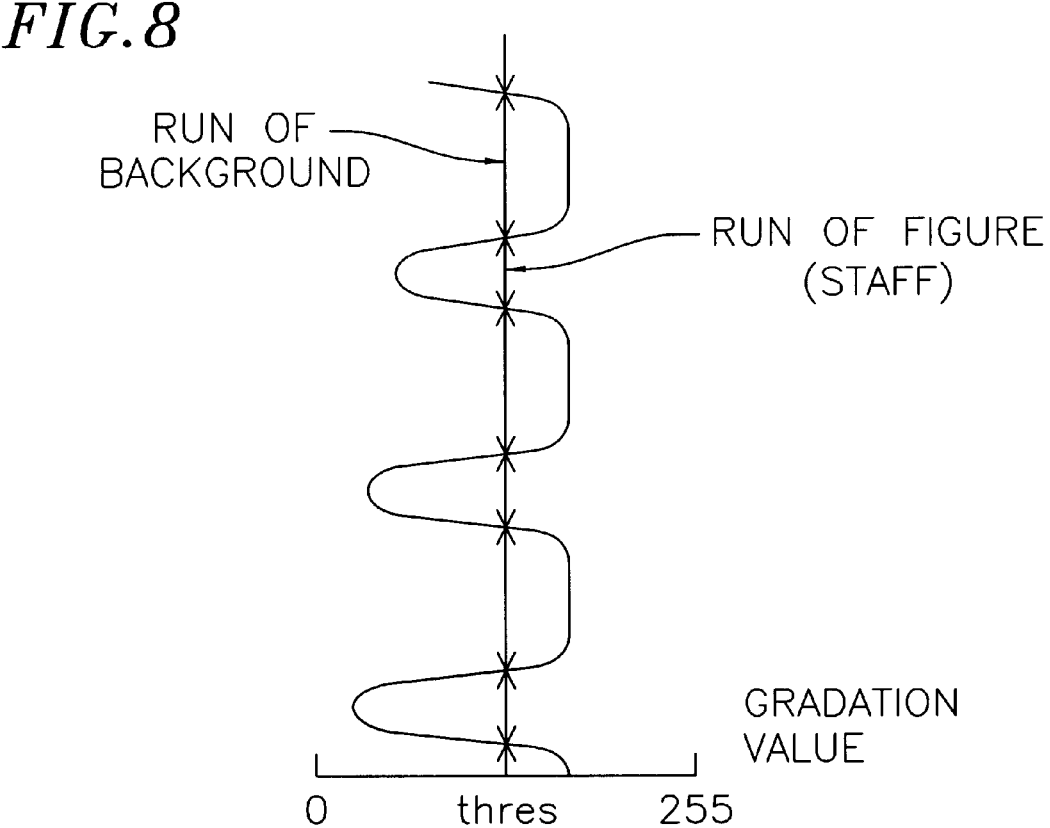
FIG. 8 is an explanatory diagram showing the state wherein a music score is longitudinally scanned so as to separate a background and a figure depending on whether values are greater or smaller than a threshold.
Figure 9:
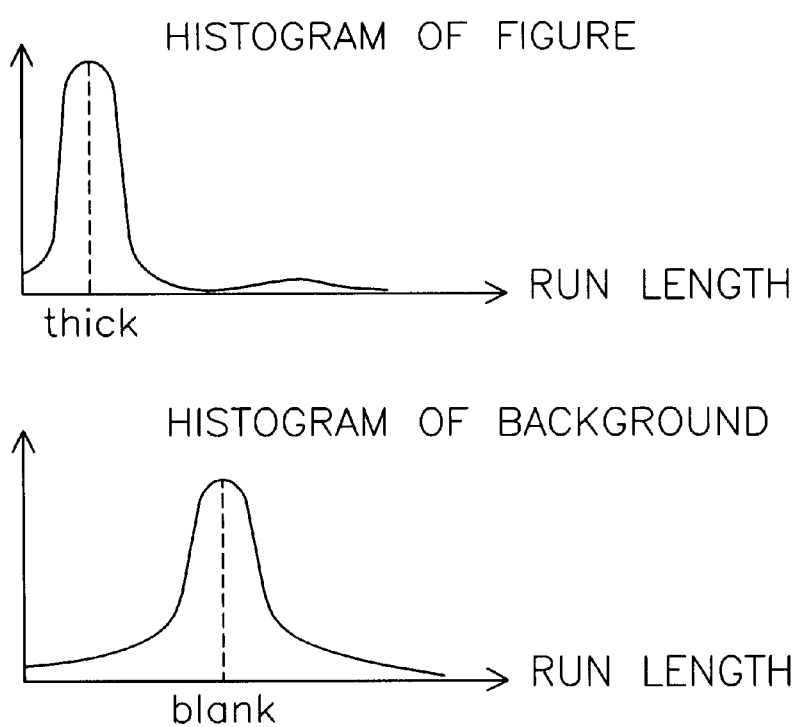
FIG. 9 is a graph showing histograms of run lengths of a line width of the staff and a staff interval, respectively.
Figure 10:
FIG. 10 is an explanatory diagram showing the state wherein longitudinal scanning of an image is carried out at certain intervals.

FIG. 7 shows a processing flow of the threshold judgment at step S102 in FIG. 5 and step S302 in FIG. 6. First at step S1020, detection of a staff interval (blank) and a line width (thick) of the staff is performed. Specifically, as shown in FIG. 8, the music score is scanned in a longitudinal direction so that a background and a figure are separated from each other depending on whether values are greater or smaller than the foregoing thresholds (thres, thres2, thres3), so as to produce histograms of run lengths of the background and the figure, respectively, as shown in FIG. 9. Then, subscripts having maximum values in the respective histograms of the background and the figure, or the centers of gravity of values of certain bands around the subscripts having the maximum values are set as a staff interval (blank) and the line width (thick) of the staff. Since the foregoing blank is actually a run length of the background, (blank+thick) is used as a staff interval (thick/2 is added to each of both ends of blank) upon calculating the ratio of the line width of the staff relative to the staff interval. The longitudinal scanning of the image does not need to be performed at all positions of abscissas X. For improving the processing speed, it may be performed at certain intervals as shown in FIG. 10.

When blank=0 at a time point of the detection (step S1021), the detection of the staff interval is unsuccessful (it can not be detected because of all black or all white) so that the processing is finished by setting a judgment result (ret) to T_NOT at step S1028. Other than this, a case where thick=0, a case where thick>blank or a case where thick or blank exceeds a certain range may be added as a detection failure of the staff interval or the line width of the staff.

After the judgment, the ratio (per) of the line width (thick) of the staff relative to the staff interval (blank+width) is derived at step S1022. Naturally, for obtaining a more accurate value or improving a correlation of the recognition rate, the foregoing ratio (per) may be derived using an equality different from that of the flow. Then at step S1023, it is judged whether the ratio (per) is equal to the target ratio (DEST_PER). If judged to be equal thereto, the judgment result (ret) is set to T_OK at step S1027. If judged to be greater than it at step S1024, the judgment result (ret) is set to T_THICK at step S1025. Further, if judged to be smaller than it, the judgment result (ret) is set to T_THIN at step S1026. Then, the judgment is finished.

In the threshold overflow check at step S109 in FIG. 5, the state of all black or all white is judged when the two-valuing is implemented using that threshold. Accordingly, in the check, it is sufficient to count the numbers of pixel values which are greater and smaller than the threshold and judge those numbers. Naturally, it is not necessary to measure all the pixels of the image, but is sufficient to check at the X positions where the staff interval and the line width of the staff are detected. Since accuracy is not required, the X positions may be further reduced for the speed-up. In the overflow check, assuming that it overflows to either black or white, the overflow to black may be judged when the counted number of black exceeds a half of the number of pixels to be checked (the sum of pixels at the X positions where the overflow check is performed), so as to finish the processing, while the overflow to white may be judged when the counted number of black is less than a half of the number of pixels to be checked.

Carrying-Out Mode 2

In the foregoing carrying-out mode 1, the staff interval and the line width of the staff detected in the whole image are used as reference values for determining the threshold. However, since run lengths of portions other than the staff are also reflected thereon, a title, a picture, a shadow of a fold of the music score or the like may influence thereon to cause the peaks of the histograms to deviate from the correct staff interval or the correct line width of the staff, so that they may differ from the staff interval or the line width of the staff detected using only the staff portion. Thus, the staff recognition is provisionally implemented with respect to an image which is two-valued with a rough threshold, and then a threshold detection process according to the binary searching method is limited around the staff.

Also in this structure, as in the foregoing carrying-out mode, a monochrome image with gradations stored in the RAM 3 (stored in a one pixel-8 bit format) is two-valued using a proper two-valuing threshold. Since the staff recognition is not largely influenced by the two-valuing threshold, a provisional threshold is simply get to a central value of the gradations. Detection of a staff interval and a line width of the staff is performed using this threshold and, if it is within an allowable range of the staff recognition, the staff recognition is performed using this threshold. Specifically, an image of the staff portion is longitudinally scanned to divide it into a line portion and a blank portion depending on whether values are greater than the threshold and produce histograms thereof, respectively. Based on these histograms, the recognition of the staff interval and the line width of the staff is implemented. It not within the allowable range, a value which can achieve the allowable range may be searched for according to the binary searching method, or the implementation of the staff recognition is stopped so as to switch to a method wherein detection of the staff interval and the line width of the staff is implemented in the whole image so as to set a threshold as in the foregoing carrying-out mode.

The staff recognition may be carried out relative to a provisional two-valued image produced separately from an area of the image with gradations in the RAM 3. Specifically, an Image of the staff portion is longitudinally scanned to divide it Into a line portion and a blank portion depending on whether values are 0 or 1 and produce histograms thereof, respectively. Based on these histograms, detection of a staff interval and a line width of the staff is carried out. On the other hand, for reducing a storage area, the separate area may not be prepared so that the provisional two-valued image may be overwritten on least significant bits of the image with gradations (changes of the least significant bits do not largely influence the detection of a threshold in case of about 256 gradations).

Figure 11:
FIG. 11 is an explanatory diagram showing the setting state of a rectangle surrounding the staff, which is set for performing a threshold judgment.
Figure 11:
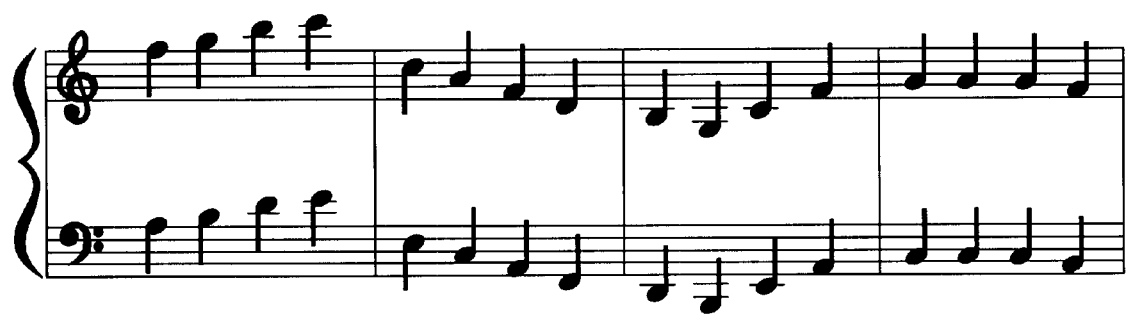

On the other hand, the staff may be directly recognized from the image with gradations based on the provisionally derived two-valuing threshold. Further, the recognition processing may be finished upon detection of one line of the staff. As shown in FIG. 11, a rectangular (dotted line portion),surrounding the detected staff is set. Right and left ends are set as end points of the staff. A leger line is often written with a relatively thicker line than the staff, and an interval between leger lines is often greater than that of the staff. Accordingly, it may be arranged that upper and lower regions of the foregoing rectangular include no leger line.

The threshold used for the two-valuing is detected according to a method similar to that of the foregoing carrying-out mode 1. However, a region to be processed is limited to the foregoing rectangular. With this arrangement, a more accurate staff interval and a more accurate line width of the staff can be obtained and, since the rectangular is small, subsequent processing steps can be reduced. Further, since the staff recognition has been implemented, the staff interval is detected at this time point. Thus, by performing only the detection of the line width of the staff during the processing of the binary searching method, further speed-up can be achieved.

Figure 12:
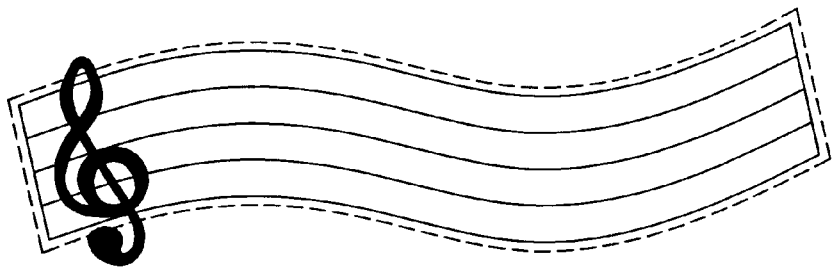
FIG. 12 is an explanatory diagram showing an example of the shape of a strip of fancy paper which is set as a threshold judging region.

In this carrying-out mode, a threshold selection method which is a normal image processing method, such as a mode method or a differential histogram, may be used for determining the two-valuing threshold for the provisional two-valuing. Further, the foregoing threshold judging region may not be rectangle, but may be a parallelogram region connecting start and end positions of the staff or, as shown in FIG. 12, it may be a region in the shape of a strip of fancy paper considering a staff deviation amount detected in the staff recognition. Further, upon the threshold detection according to the binary searching method, not only the staff interval and the line width of the staff are detected, but also a process of longitudinally scanning the image which is two-valued with that threshold along the first detected staff and deriving an average of run lengths of portions which are surely the staff, may be added for detecting the line width of the staff accurately.

Carrying-Out Mode 3

Figure 13:
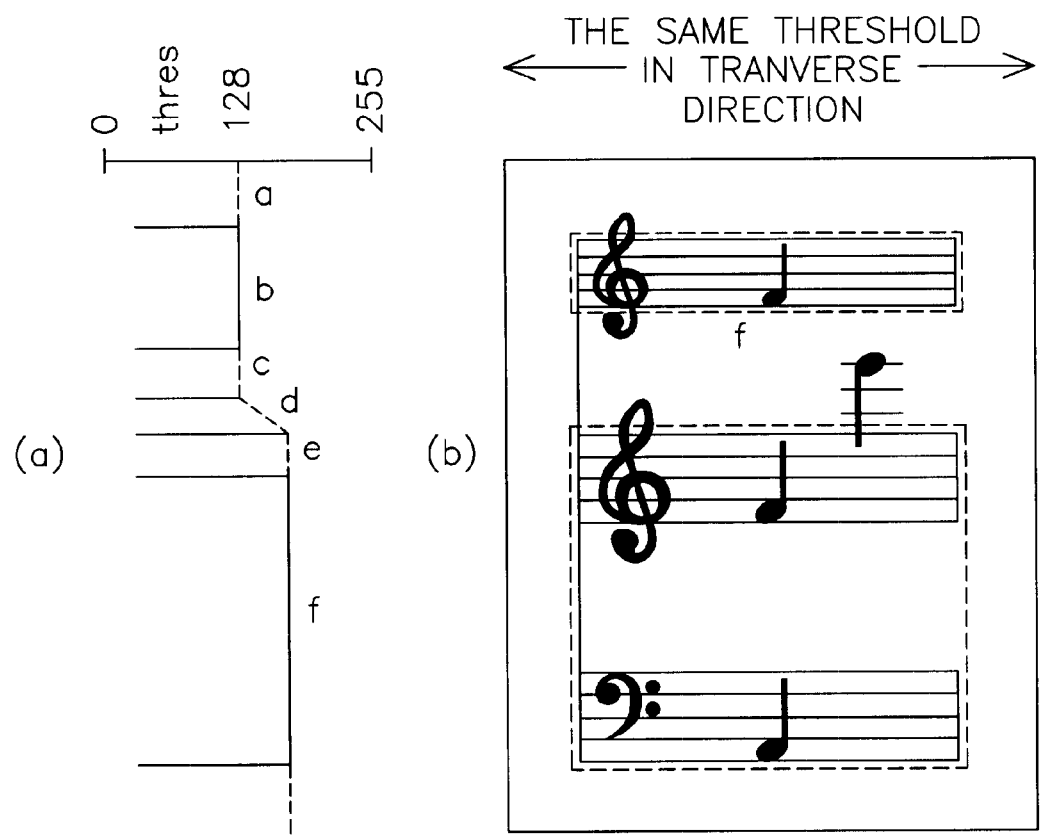
FIG. 13 is an explanatory diagram showing an example of two-valuing processing in threshold determination.

In most cases, it is sufficient to determine one two-valuing threshold in one music score image. However, there is a case where it is insufficient. A particularly notable example is a case where there are the staffs having different widths. In such a case, if the two-valuing is implemented using the same threshold, a threshold for the staff which is not referred to deviates from an optimum value so that the recognition rate is lowered. Thus, in this carrying-out mode, the staffs are detected (all the staffs are detected) according to a method similar to that of the foregoing carrying-out mode, and rectangles surrounding the respective staffs are detected. Detection of brackets is also performed and, as shown in FIG. 13(*b*), a rectangle may be set per part. These rectangles are for threshold determination. In the rectangles, the respective two-valuing thresholds are determined according to means similar to that of the carrying-out mode 1.

In a two-valuing process after the threshold determination, regions in the rectangles are two-valued using the corresponding thresholds. On the other hand, as shown in FIG. 13(*a*), a region between the rectangles is two-valued according to the following method:

(1) When the region is two-valued using an intermediate value between the thresholds of the upper and lower rectangle regions, a position where a figure does not exist is searched for from the middle point between the two regions and separation is made at the detected position.

(2) When two-valued similarly, a region where a figure does not exist is searched for and separation is made at a position of the widest region.

(3) An intermediate threshold between those of the two rectangle regions is interpolated according to various methods.

(4) Regions of two thresholds are separated at the middle between the two rectangle regions.

FIG. 13 shows a two-valuing example in the threshold determination. The same figure (b) shows a music score image read in, wherein dotted line rectangles are threshold determining rectangles. On the other hand, the same figure (a) shows the state of determined thresholds, wherein sections b and f use thresholds determined in the respective rectangles, sections a and c at ends of the image use the same threshold as that of the section b, a section e uses the same threshold as that of the section f, and a section d uses the thresholds of the two regions through linear interpolation.

By varying a threshold, it is possible to deal with partial print blurring or the like. This can be realized not by setting only one rectangle in a transverse direction (the same threshold in the transverse direction) as shown in FIG. 13, but by dividing into a plurality of rectangles.

The foregoing threshold judging region may not be rectangle, but, as described before, may be a parallelogram region connecting start and end positions of the staff, or it may be a region in the shape of a strip of fancy paper considering a staff deviation amount detected in the staff recognition.

According to the structure of the present invention described above in detail, the two-valued image optimum for the recognition can be obtained using the music score information so that the recognition rate can be improved. Further, the manual setting of the optimum threshold is not required upon scanning the image so that the operation efficiency can be improved.

Industrial Applicability

As described above, the structures of the music score recognizing method and the computer-readable recording medium storing the music score recognizing program are useful for a case where a music score is mechanically recognized, and particularly suitable for a case where data for a karaoke performance is prepared from a music score or a case where a manual performance is partly replaced with a mechanical performance in studio recording or live performance.

What is claimed is:

1. A music score recognizing method of reading a music score image and recognizing music signs therein to prepare data for playing and/or music score displaying, said music score recognizing method characterized in that a two-valuing threshold is so set as to render a ratio between a line width of a staff and a staff interval in the music score image equal to a preset value, so as to input the music score image as a two-valued image based on the set two-valuing threshold.

2. The music score recognizing method according to claim 1, wherein when a band including a plurality of two-valuing thresholds that render said ratio equal to said preset value exists, the aforementioned two-valuing threshold is set to the middle point of the band.

3. The music score recognizing method according to claim 1, wherein said preset value comprises the ratio between the line width of the staff and the staff interval that results in highest recognition rates for a plurality of music score images.

4. A music score recognizing method of reading a music score image and recognizing music signs therein to prepare data for playing and/or music score displaying, said music score recognizing method characterized in that the image is divided into a plurality of blocks and a two-valuing threshold is so set per block as to render a ratio between a line width of a staff and a staff interval in the corresponding block equal to a preset value for the corresponding block, so as to input the music score image as a two-valued image based on the set two-valuing thresholds.

5. A computer-readable recording medium storing a music score recognizing program for reading a music score image and recognizing music signs therein to prepare data for playing and/or music score displaying, said music score recognizing program allowing execution of an information reading step of reading music score information comprising a ratio between a line width of a staff and s staff interval, a threshold setting step of setting a two-valuing threshold so as to render said ratio between the line width of the staff and the staff interval in the music score image equal to a preset value, and a two-valued image inputting step of inputting the music score image as a two-valued image based on the set two-valuing threshold.

6. A computer-readable recording medium storing a music score recognizing program for reading a music score image and recognizing music signs therein to prepare data for playing and/or music score displaying, said music score recognizing program allowing execution of an image reading step of reading the image, an image dividing step of dividing the read image into a plurality of blocks, an information reading step of reading music score information per block, said music score information comprising a ratio between a line width of a staff and a staff interval, a threshold setting step of setting a two valuing threshold per block so as to render said ratio between the line width of the staff and the staff interval in the corresponding block equal to a preset value for the corresponding block, and a two-valued image inputting step of inputting the music score image as a two-valued image based on the two-valuing threshold set per block.

7. A method of recognizing music score of a music score image, the method comprising:

determining a value for a ratio between a line width of a staff and a staff interval that corresponds to highest recognition rates for a plurality of music score images;

storing said determined value in memory; and determining a two-valuing threshold that achieves the ratio between the line width of the staff and the staff interval of the music score image that is as close to said determined value as possible.

8. The method of claim 7, further comprising:

inputting the music score image as a two-valued image based on said two-valuing threshold.

9. The method of claim 7, further comprising:

dividing said plurality of music score images into a plurality of blocks;

for each block of said plurality of music score images, determining the value for the ratio between the staff interval and the line width of the staff that corresponds to highest recognition rates;

dividing the music score image into a plurality of blocks; and for each block of the music score image, determining a two-valuing threshold that achieves the ratio between the line width of the staff and the staff interval in the corresponding block of the music score image that is as close to the corresponding determined value as possible.

10. The method of claim 7, further comprising: if said determined value is achieved by each of a plurality of two-valuing thresholds comprising a band, setting said two-valuing threshold to a middle point of the band.

11. The method of claim 9, further comprising:

inputting the music score image as a two-valued image based on said two-valuing threshold per block.

\* \* \* \* \*

UNITED STATES PATENT AND TRADEMARK OFFICE
CERTIFICATE OF CORRECTION

PATENT NO.    : 6,580,805 B1
DATED         : June 17, 2003
INVENTOR(S)   : Nakano It is certified that error appears in the above-identified patent and that said Letters Patent is hereby corrected as shown below:

Title page,
Item [56], References Cited, FOREIGN PATENT DOCUMENTS, delete "JP 2-87776 3/1990"

Drawings,
Sheet 4, Fig. 5, in the descriptive legend of S110, replace "OVERFLOW TO BLACK SIDE SIDE" with -- OVERFLOW TO BLACK SIDE --.
Sheet 10, Fig. 13, in the description of (b), replace "THE SAME THRESHOLD IN TRANVERSE DIRECTION" with -- THE SAME THRESHOLD IN TRANSVERSE DIRECTION --.

Column 11,
Line 34, delete "s" after the word "and".

Signed and Sealed this

Twelfth Day of October, 2004

JON W. DUDAS
*Director of the United States Patent and Trademark Office*